United States Patent
Steinmetz et al.

(10) Patent No.: US 6,929,860 B2
(45) Date of Patent: Aug. 16, 2005

(54) USE OF AMPHIPHILIC POLYMERS OR COPOLYMERS FOR SURFACE MODIFICATION OF REACTIVE INORGANIC FILLERS

(75) Inventors: Alan Lawrence Steinmetz, Louisville, KY (US); Norbert Schall, Forstern (DE); Klaus Dziwok, Freilassing (DE); Helmut Coutelle, Freising (DE); Wolfgang Simon, Neufahrn (DE); Stefan Dick, Weichering (DE); Inge Krämer, Freising (DE); Hubert Schiessling, Landshut (DE)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 10/343,647

(22) PCT Filed: Aug. 2, 2001

(86) PCT No.: PCT/EP01/08491

§ 371 (c)(1),
(2), (4) Date: Apr. 29, 2003

(87) PCT Pub. No.: WO02/13285

PCT Pub. Date: Feb. 14, 2002

(65) Prior Publication Data

US 2003/0165684 A1 Sep. 4, 2003

(30) Foreign Application Priority Data

Aug. 4, 2000 (DE) .......................... 100 38 147
Dec. 22, 2000 (DE) .......................... 100 64 240

(51) Int. Cl.[7] ............................... B32B 5/16
(52) U.S. Cl. ................................ 428/407; 428/403
(58) Field of Search ........................... 428/403, 404, 428/405, 406, 407

(56) References Cited

U.S. PATENT DOCUMENTS

| | | | | |
|---|---|---|---|---|
| 4,716,103 A | * | 12/1987 | Hunger et al. ................. | 435/5 |
| 4,894,411 A | * | 1/1990 | Okada et al. .................. | 524/710 |
| 5,582,638 A | * | 12/1996 | Coutelle et al. ............... | 106/287.23 |
| 5,627,232 A | | 5/1997 | Glancy et al. | |
| 5,629,373 A | | 5/1997 | Glancy et al. | |
| 5,914,373 A | | 6/1999 | Glancy et al. | |
| 6,140,401 A | | 10/2000 | Wedl et al. | |
| 6,649,138 B2 | * | 11/2003 | Adams et al. ................. | 423/403 |
| 6,800,096 B1 | * | 10/2004 | Legrand et al. ............... | 8/401 |

FOREIGN PATENT DOCUMENTS

| | | |
|---|---|---|
| DE | 10038147 | 2/2002 |
| DE | 19836580 | 2/2002 |

* cited by examiner

Primary Examiner—H. Thi Le
(74) Attorney, Agent, or Firm—Scott R. Cox

(57) ABSTRACT

Surface-modified fillers are described characterized by the fact that the fillers represent reactive inorganic fillers and the modifying agent represents an amphiphilic aminoplastic-ether polymer or copolymer of the structural type

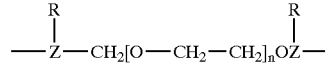

in which:

Z denotes the same or different aminoplastic central units based on melamine-formaldehyde or urea-formaldehyde derivatives;

n=10 to 500;

R denotes the group —[O—$CH_2$—$CH_2$]$_m$O—S in which m=5 to 500 and

S represents a substituted or unsubstituted alkyl, aryl, alkaryl or aralkyl group.

20 Claims, No Drawings

USE OF AMPHIPHILIC POLYMERS OR COPOLYMERS FOR SURFACE MODIFICATION OF REACTIVE INORGANIC FILLERS

DESCRIPTION

The invention concerns surface-modified active inorganic fillers modified with amphiphilic polymers or copolymers, as well as their use in polymers, especially PVC.

PVC can be stabilized by a number of additives (R. Gächter, H. Müller, Carl Hanser Verlag, $3^{rd}$ edition, 1989, Plastic Additives). In addition to ordinary additives, like epoxidized fatty acid esters, zinc, cadmium, lead and/or alkali and/or alkaline earth carboxylates or aluminum carboxylates, phosphites; antioxidants, β-dicarbonyl compounds, plasticizers, lubricants and pigments, fillers are used. Hydroxides, carbonates, silicates, dolomites can be used as fillers and e.g. titanium dioxide and/or zirconium oxide can be used as pigments. The composition can also contain at least one zeolite compound and a layered compound, like hydrotalcite. Hydrotalcites are described in EP-A-0 772 648 as active fillers with a stabilizing effect in PVC.

German Patent Application 10038147.2 describes amphiphilic graft polymers or copolymers that contain the same or different base polymer chains, the same or different central units based on a melamine-formaldehyde or urea-formaldehyde derivative, as well as the same or different polar or nonpolar side chains. These graft polymers or copolymers can be used, among other things, as adhesion promoters between inorganic or organic pigment and/or filler surfaces and organic polymer matrices. No specific data are present concerning the type of pigments or fillers.

It was found that active fillers, like hydrotalcite for polymer masses, can be strongly electrostatically charged during grinding and therefore are difficult to transport or pack into sacks. These fillers also had a tendency to agglomerate and adhere to surfaces of the employed equipment and pipes, which often led to clogging. The task therefore consisted of finishing these fillers antistatically. At the same time, the antistatic agent was not supposed to adversely affect the stabilizing effect of these fillers in polymer masses, especially in halogen-containing polymer masses, like polyvinyl chloride.

Linear aminoplastic-ether copolymers are known from U.S. Pat. Nos. 5,627,232, 5,629,373 and 5,914,373 that contain a bifunctional alkylene oxy group and a skeletal group of an aminoplastic, like glycoluril.

It was found that amphiphilic aminoplastic-ether polymers are particularly suitable for surface modification of reactive inorganic fillers.

The object of the invention are surface-modified fillers characterized by the fact that the fillers represent reactive inorganic fillers and the modifying agent represents an amphiphilic aminoplastic-ether polymer or copolymer of the structural type

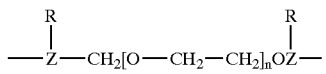

in which:

Z denotes the same or different aminoplastic central units based on melamine-formaldehyde or urea-formaldehyde derivatives;

n=10 to 500;

R denotes the group $-[O-CH_2-CH_2]_mO-S$ in which m=5 to 500 and

S represents a substituted or unsubstituted alkyl, aryl, alkaryl or aralkyl group.

The term "aminoplasts" is the term for melamine, urea, benzoguanine and carbamide ester resins. Resin in this context means that the melamine, urea, benzoguanine or carbamide monomers were polymerized with formaldehyde to form a "resin".

Reactive inorganic fillers for polymer masses are understood to mean inorganic fillers that interact in any way with the polymer masses or their decomposition products. Specific mechanical and/or physical properties of the polymer matrix can be altered with fillers. Since the active function can be different in nature, a definition is only possible in conjunction with the corresponding polymer. Such fillers are flame retardants and reinforcing fillers, for example. In addition, these fillers can react with substances that form during thermal, chemical or radiation-induced decomposition of the polymer masses. The substances include hydrogen halides that form during decomposition of halogen-containing polymer masses, like polyvinyl chloride (PVC).

The reactive fillers preferred for use in halogen-containing polymers are double-layer hydroxides with internal crystalline charge balance and can be described by the following general formula:

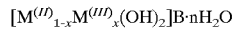

in which $M^{(II)}$ denotes a divalent metal ion, $M^{(III)}$ a trivalent metal ion, B a mono- or polybasic organic or inorganic anion and n=0–10. There are natural and synthetic double-layer hydroxides in which $M^{(II)}$ is a divalent ion, for example, magnesium, zinc, calcium, iron, cobalt, copper, cadmium, nickel and/or manganese and $M^{(III)}$ is a trivalent ion, for example, aluminum, iron, boron, manganese, bismuth and/or cerium.

A double-layer hydroxide that occurs in nature is hydrotalcite, which is derived from the mineral brucite and satisfies the following ideal formula:

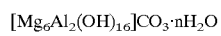

Some magnesium ions in hydrotalcite are replaced by aluminum ions so that the individual layer acquires a positive charge. This is balanced by carbonate anions that are situated in the interlayers together with water of crystallization.

The double-layer hydroxide, however, can also be easily produced synthetically by conversion of di- and trivalent metal salt solutions, for which DE-A-198 36 580 is referred to.

Magnesium oxide, hydroxide or carbonate, as well as dolomite, calcium carbonate (for example, chalk) are considered as example for reactive fillers from the group of oxides, hydroxides or carbonates of alkaline earth metals. Either the natural mineral or synthetically produced products can be used for this purpose. Calcium carbonate is used with particular preference, which during decomposition of polyvinyl chloride reacts with the formed hydrogen chloride and in this manner fulfills the dual function of an HCl scavenger and a processing auxiliary. The same applies for zinc carbonate. The corresponding oxides and hydroxides have this dual function, since water is liberated during conversion of these substances with hydrogen chloride, which interrupts combustion.

Surface modification of the active filler preferably occurs with amphiphilic aminoplastic-ether polymers. The aminoplastic central unit is preferably derived from monomers of the formula

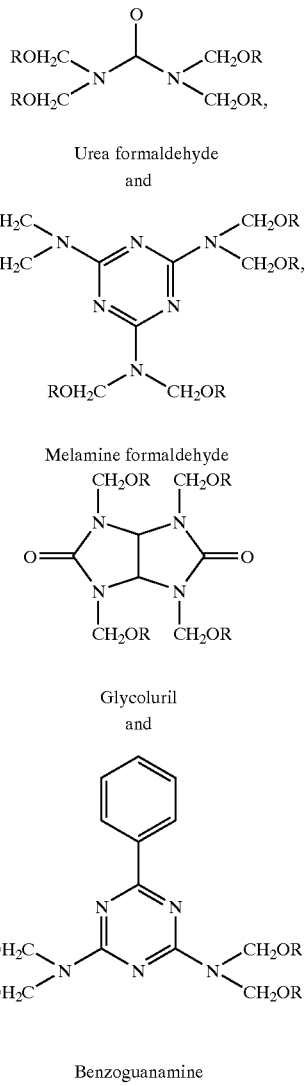

Urea formaldehyde
and

Melamine formaldehyde

Glycoluril
and

Benzoguanamine

Preferably R represents a lower alkyl group, especially a methyl or ethyl group. The Z central unit is preferably derived from glycoluril.

The molar ratio between aminoplastic central unit Z and the group —[OCH$_2$—CH$_2$]$_n$—O— is preferably about 0.5 to 2, especially 0.5 to 1.7.

The molar ratio between substituents R and the aminoplastic central unit Z is preferably about 0.5 to 4, especially about 0.5 to 2.

The amphiphilic polymer or copolymer is preferably present in an amount of about 0.1 to 5, especially about 0.1 to 2 wt %. At amounts of more than about 5 wt %, problems can occur during incorporation of the surface-modified fillers in the polymer masses. An unduly high fraction of amphiphilic polymer in halogen-containing polymer masses reduces the thermal stability of PVC.

The object of the invention is also a method for production of the surface modified in organic fillers described, characterized by the fact that
  (a) a solution or a suspension of amphiphilic polymer or copolymer is contacted with a reactive filler in the form of a dry powder, a wet mass or a suspension, the solvent or dispersant is removed and the obtained product optionally ground; or
  (b) the amphiphilic polymer or copolymer is contacted with the reactive filler in the form of a melt; or
  (c) the amphiphilic polymer or copolymer is ground dry with the reactive filler.

The method according to the invention is preferably conducted so that (variant a) the amphiphilic polymer or copolymer is initially allowed to swell in an organic cosolvent; or (variant b) the melt of the amphiphilic polymer or copolymer is applied at a temperature between the melting point and 200° C.; or (variant c) grinding is carried out at a temperature between room temperature and 200° C.

An object of the invention is also the use of the surface modified inorganic active fillers just defined as additives to polymer masses, especially to halogen-containing polymer masses like polyvinyl chloride.

The surface modified fillers can be processed to a compound according to the usual methods with the polymer masses. Commercial mixing units offer themselves as compounding aggregates for this purpose, like single or twin-screw kneaders, co-kneaders, internal mixers or a roll stand (PVC). The contents of surface-modified fillers can be added in an amount of 0.1 to 70 wt % depending on the filler and the corresponding polymer matrix. Hydrotalcites are generally added to halogen-containing polymers between 0.1 and a maximum of 15 wt %.

The invention is explained nonrestrictively by the following examples.

For purposes of this application a translation of Example 2 from DE-A 198 36 580 is incorporated, as follows:

Example 2 a) Synthesis of hydrotalcite in the carbonate form

In a 10 l reaction vessel 203 g MgCl$_2$×6 H$_2$O and afterwards 121 g AlCl$_3$×6 H$_2$O are dissolved in 7 l demineralised water. Then the p H is adjusted to 10.5 by adding a 10% sodium carbonate solution. The reaction mixture is heated to 80° C. and kept at this temperature for 24 h while stirring. The solid matter is then separated from the liquid with a suction filter and the filter cake is washed three times with 1 liter demineralised water. The washed precipitate is then dried for 24 h at 110° C. in a forced-air oven and milled with a pin beater mill to a particle size of <63 μm.

The layer distance was determined by X-ray to be 0.7 nm.

b) hydrotalcite surface modified with sodium stearate (comparison)

250 g of the hydrotalcite obtained in example 2a are suspended in 5 liters of demineralised water and then heated to 80° C. Then, 3 liters of an aqueous solution of sodium stearate containing 25 a sodium stearate are added. The reaction mixture is stirred for 24 h at 80° C. and then filtered with a suction filter. The precipitate is washed three time with 1 liter demineralised water each, dried in a forced-air oven at 110° C. for 24 h and then milled to a particle size of <63 μm.

The layer distance was determined by x-ray diffraction to be 0.7 nm. i.e. there has not occurred any widening of the layer distance.

EXAMPLE 1

A hydrotalcite in carbonate form produced according to example 2(a) of DE-A 198 36 580 was prepared as follows:

In a 10 l reaction vessel 203 g MgCl$_2$×6 H$_2$O and afterwards 121 g AlCl—3×6 H$_2$O are dissolved in 7 l demineralized water. Then the pH is adjusted to 10.5 by adding a 10% sodium carbonate solution. The reaction mixture is heated to 80° C. and kept at this temperature for 24 h while stirring. The solid matter is then separated from the liquid with a suction filter and the filter cake is washed three times with 1 liter demineralised water. The washed precipitate is then dried for 24 h at 110° C. in a forced-air oven and milled with a pin beater mill to a particle size of <63 μm.

The layer distance was determined by X-ray to be 0.7 nm.

100 g of this hydrotalcite was coated with 0.5, 1.0 and 2.0 wt % of an amphiphilic copolymer of the aforementioned general formula in which for compound A, Z=glycoluril, n=180, m=16, S=tristyrylaryl and for compound B, Z=glycoluril, n=180, m=40, S=arylacryl.

Differential calorimetry studies (DSC) showed that the melting point of the two modifying agents lies at 49.5° C. Decomposition occurred at temperatures of about 120 to 180° C. Brown coloration appeared after 3 hours at 180° C.

Coating of the reactive filler was conducted as follows.

Variant (a)

10% aqueous solutions of organic modifying agents A and B were applied to 50 g wet hydrotalcite filter cake (water content about 35 wt %), dried at 150° C. for 2 to 3 hours in a drying cabinet, and ground.

Variant (b)

The organic modifying agents A and B were mixed in highly crushed form with the hydrotalcite filter cake before or after drying, and ground.

Variant (c)

The organic modifying agents A and B were melted and mixed with the hydrotalcite before or after drying, and ground. The viscosity of the modifying agents is so limited at 60 to 80° C. that it can be added dropwise.

Variant (d)

Hydrotalcite is mixed with water, and the organic modifying agents A and B are added under good agitation. The obtained slurry can be fed to drying, for example, by means of a spray dryer. The slurry can also be filtered and the filter residue fed to drying, for example, belt drying.

The method according to the invention can expediently be integrated in a process for production and processing of fillers.

The hydrotalcites modified according to variants (a) to (d) were incorporated in known fashion dry in the soft PVC powder mixtures. The PVC powder contains stabilizers (zinc stearate, Rhodiastab 50) and plasticizers (diisododecyl phthalate).

For comparison, an unmodified hydrotalcite from Kyowa Co. and hydrotalcites modified with amphiphilic copolymers A and B were incorporated in soft PVC powder.

For the modification of the hydrotalcites a method was used as described in example 2(b) of DE-A-198 36 580 as follows:

250 g of the hydrotalcite were suspended in 5 liters of demineralised water and then heated to 80° C. Then, 3 liters of an aqueous solution of amphiphilic copolymers A or B containing 25 g amphiphilic copolymers A or B were added. The reaction mixture was stirred for 24 h at 80° C. and then filtered with a suction filter. The precipitate was washed three times with 1 liter demineralised water each, dried in a forced-air oven at 110° C. for 24 h and then milled to a particle size of <63 μm.

For incorporating the hydrotalcite in the soft PVC powder, the filler was mixed with the soft PVC powder and plasticized in known fashion on a mixing roll stand at 180° C. or in a kneader.

The results are shown in Table I.

TABLE I

Properties of surface-modified hydrotalcites.

| | Standard "Alcamizer 1" (Kyowa Co.) | HT and compound B | | HT and compound A | |
|---|---|---|---|---|---|
| | | 2 wt % | 1 wt % | 2 wt % | 1 wt % |
| VDE test | 141 min | −6.0% after 195 min | −2.8% after 207 min | −4.3% after 190 min | −2.8% after 207 min |
| Mathis furnace discoloration | 215 min | | | | |
| Flowability in glass | — | very good | good | very good | good |

The stabilizing effect of additives, especially hydrotalcites, is checked in PVC generally with a VDE test according to DIN 53 581 PVC A or VDE 0472 § 614 and the Mathis furnace test. In the VDE test, the time that causes an irreversible chemical change from the effect of heat and is characterized by release of HCl is determined. The split-off HCl is determined by the color change of a universal indicator paper at pH 3. The percentage time deviation from the standard is evaluated.

In the Mathis furnace thermotest, PVC samples are exposed to a heat load of different length, which is stipulated by the advance of a slide from the furnace. The color trend of the sample strip serves as relative gauge of the static temperature resistance.

The results of Table I show that no adverse effect on heat stability could be observed from 1 wt % with compound A or B in the example according to the invention. It was found that a clearly antistatic finishing of the active filler with compounds A and B is possible, which significantly simplifies the flowability and consequently transport in the installations and packing into sacks of the filler.

The effect of the antistatically finished active filler on the electrical properties in PVC rolled sheet was investigated with an annular electrode. Measurement of the conductivity of the surface according to ASTM D257 is an evaluation criterion for antistatic additives. The surface conductivity shows whether the material possesses high or limited conductivity, but is not necessarily a gauge of electrostatic power.

The results of the conductivity measurement on soft PVC rolled sheets are summarized in Table II.

Experiment no. 1 contains the unmodified hydrotalcite Alcamizer 1 from Kyowa Co., experiment no. 2 contains hydrotalcite modified with compound A (2 wt % modifying agent referred to HT).

TABLE II

| | Resistance/Ω at 100 V; 23.9° C. RH 15% | Specific resistance at 40 V; 23.7° C.; RH 32.5% | Specific resistance at 100 V; 23.9° C.; RH 15% |
|---|---|---|---|
| Experiment 1 | $1.6 \cdot 10^9$ | $1.78 \cdot 10^{12}$ | $6.3 \cdot 10^{10}$ |
| Experiment 2 | $1.3 \cdot 10^9$ | $1.98 \cdot 10^{12}$ | $6.6 \cdot 10^{10}$ |

The magnitude of the measured surface resistance lies in the range of insulating materials, i.e., the surface-modified hydrotalcite has no effect in the employed amount on the electrical conductivity of the PVC rolled sheet. This is evaluated positively for application of soft PVC mixture as a cable sheathing (insulator).

The wetting effect in the aqueous phase was also investigated. The unmodified hydrotalcite is not wetted by water in this case and floats on the water surface. The surface-modified hydrotalcites A and B are well wetted by water and can be readily suspended. This property is important for mixing in polar media.

EXAMPLE 2

Surface modification of calcium carbonate.

100 g calcium carbonate was coated with 0.5 wt %, 1.0 wt %, 2.0 wt % and 4.0 wt % compound A and compound B. Coating was conducted according to variants (a) to (d).

EXAMPLE 3

Surface modification of magnesium hydroxide.

100 g magnesium hydroxide was coated with 0.5 wt %, 1.0 wt % and 4.0 wt % compound A and compound B. Coating was according to variants (a) to (d).

EXAMPLE 4

Surface modification of hydromagnesite.

100 g hydromagnesite was coated with 0.5 wt %, 1.0 wt %, 2.0 wt % and 4.0 wt % compound A and compound B. Coating was conducted to variants (a) to (d).

What is claimed is:

1. A surface-modified inorganic surface filler comprising a reactive inorganic filler modified by an amphiphilic aminoplastic-ether polymer or copolymer of the following structure:

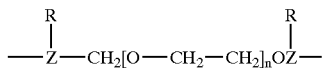

in which:

Z denotes the same or different aminoplastic central units based on derivatives of melamine-formaldehyde, urea-formaldehyde, glycoluril or benzoguanimine;

n=10 to 500;

R denotes the group —[O—CH$_2$—CH$_2$]$_m$O—S in which m=5 to 500; and

S represents a substituted or unsubstituted alkyl, aryl, alkylaryl or aralkyl group.

2. The surface-modified inorganic surface filler of claim 1 wherein the reactive inorganic filler comprises a double-layer hydroxide or an oxide, hydroxide or carbonate of an alkaline earth metal or zinc.

3. The surface-modified inorganic surface filler of claim 2 wherein the double-layer hydroxide comprises hydrotalcite.

4. The surface-modified inorganic surface filler of claim 1 wherein the aminoplastic central unit Z is derived from monomers selected from the group consisting of

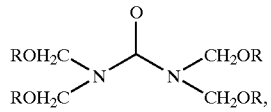

Urea formaldehyde
and

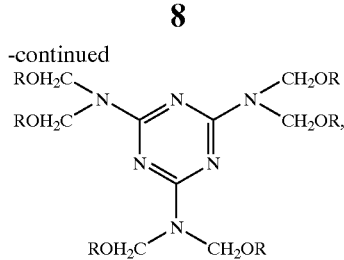

Melamine formaldehyde

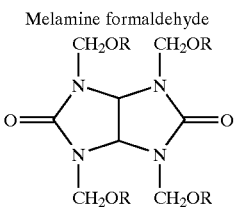

Glycoluril
and

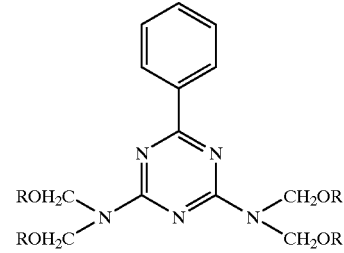

Benzoguanamine in which R represents a lower alkyl group.

5. The surface-modified inorganic surface filler of claim 1 wherein the Z central unit is derived from glycoluril and wherein R represents an alkyl group with 5 to 15 carbon atoms or an alkylaryl group with 5 to 15 carbon atoms in the alkyl group.

6. The surface-modified inorganic surface filler of claim 1 wherein the molar ratio between the aminoplastic central unit Z and the group —[OCH$_2$—CH$_2$]—O— is from about 0.5 to about 2.

7. The surface-modified inorganic surface filler of claim 1 wherein the molar ratio between the aminoplastic central unit Z and the group —[OCH$_2$—CH$_2$]—O— is from about 0.5 to about 1.7.

8. The surface-modified inorganic surface filler of claim 1 wherein the molar ratio between the substituent R and the aminoplastic central unit Z is from about 0.5 to about 4.

9. The surface-modified inorganic surface filler of claim 1 wherein the molar ratio between the substituent R and the aminoplastic central unit Z is from about 0.5 to about 2.

10. The surface-modified inorganic surface filler of claim 1 wherein the amphiphilic polymer or copolymer is present in an amount from about 0.1 to about 5 weight percent.

11. The surface-modified inorganic surface filler of claim 1 wherein the amphiphilic polymer or copolymer is present in an amount from about 0.1 to about 2 weight percent.

12. A surface modified polymer comprising the surface modified filler of claim 1 blended with a polymer.

13. The polymer of claim 12 wherein the surface modified filler comprises from about 0.1 to about 70 weight percent.

14. A surface modified polymer comprising the surface modified filler of claim 1 blended with a halogen-containing polymer.

15. A method for the production of a surface-modified inorganic surface filler comprising mixing a solution or suspension of an amphiphilic polymer or copolymer with a reactive filler, wherein the filler is in the form of a dry powder, a wet mass or a suspension;

removing the solvent or dispersant from the mixture;

grinding the attained powder to form the filler, wherein the amphiphilic polymer or copolymer comprises the following structure

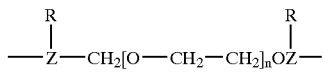

in which:

Z denotes the same or different aminoplastic central units based on melamine-formaldehyde or urea-formaldehyde derivatives;

n=10 to 500;

R denotes the group —[O—CH$_2$—CH$_2$]$_m$O—S in which m=5 to 500 and

S represents a substituted or unsubstituted alkyl, aryl, alkylaryl or aralkyl group.

16. The method of claim 15 wherein the amphiphilic polymer or copolymer is initially allowed to swell in a solvent.

17. A method for the production of a modified inorganic surface filler comprising blending an amphiphilic polymer or copolymer in the form of a melt with a reactive filler wherein the amphiphilic polymer or copolymer comprises the following structure:

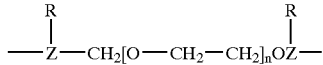

in which:

Z denotes the same or different aminoplastic central units based on melamine-formaldehyde or urea-formaldehyde derivatives;

n=10 to 500;

R denotes the group —[O—CH$_2$—CH$_2$]$_m$O—S in which in 5 to 500 and

S represents a substituted or unsubstituted alkyl, aryl, alkylaryl or aralkyl group.

18. The method of claim 17 wherein the melt of the amphiphilic polymer or copolymer is brought to a temperature between its melting point and 200° C.

19. A method for the production of a modified inorganic surface filler comprising dry grinding an amphiphilic polymer or copolymer with a reactive filler wherein the amphiphilic polymer or copolymer comprises

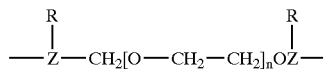

in which:

Z denotes the same or different aminoplastic central units based on melamine-formaldehyde or urea-formaldehyde derivatives;

n=10 to 500;

R denotes the group —[O—CH$_2$—CH$_2$]$_m$O—S in which m=5 to 500 and

S represents a substituted or unsubstituted alkyl, aryl, alkylaryl, or aralkyl group.

20. The method of claim 19 wherein the amphiphilic polymer or copolymer is ground with the reactive filler at a temperature between room temperature and 200° C.

* * * * *